US009706618B2

United States Patent
Furuya et al.

(10) Patent No.: US 9,706,618 B2
(45) Date of Patent: Jul. 11, 2017

(54) AUDIO OUTPUT CIRCUIT OF CONDENSER MICROPHONE

(71) Applicant: KABUSHIKI KAISHA AUDIO-TECHNICA, Machida-shi, Tokyo (JP)

(72) Inventors: Hiroaki Furuya, Machida (JP); Hiroshi Akino, Machida (JP); Satoshi Yoshino, Machida (JP)

(73) Assignee: KABUSHIKI KAISHA AUDIO-TECHNICA, Machida-shi, Tokyo (JP)

( * ) Notice: Subject to any disclaimer, the term of this patent is extended or adjusted under 35 U.S.C. 154(b) by 0 days.

(21) Appl. No.: 15/243,129

(22) Filed: Aug. 22, 2016

(65) Prior Publication Data

US 2017/0064449 A1    Mar. 2, 2017

(30) Foreign Application Priority Data

Sep. 1, 2015    (JP) ................................. 2015-171654

(51) Int. Cl.
| | |
|---|---|
| H04R 1/08 | (2006.01) |
| H04R 3/00 | (2006.01) |
| H05B 33/08 | (2006.01) |
| H04R 19/04 | (2006.01) |

(52) U.S. Cl.
CPC ........... *H05B 33/0842* (2013.01); *H04R 1/08* (2013.01); *H04R 3/00* (2013.01); *H04R 19/04* (2013.01)

(58) Field of Classification Search
CPC . H04R 3/00; H04R 19/04; H04R 1/08; H05B 33/0842
See application file for complete search history.

(56) References Cited

U.S. PATENT DOCUMENTS

| | | | | |
|---|---|---|---|---|
| 2006/0078152 A1* | 4/2006 | Royer | .................... | H04R 9/048 381/399 |
| 2012/0288113 A1* | 11/2012 | Akino | .................... | H04R 1/406 381/92 |
| 2013/0322637 A1* | 12/2013 | Akino | ...................... | H04R 3/00 381/58 |
| 2015/0326980 A1* | 11/2015 | Okita | .................... | H04R 23/00 381/174 |

FOREIGN PATENT DOCUMENTS

JP    2015-097312 A    5/2015

* cited by examiner

*Primary Examiner* — Muhammad N Edun
(74) *Attorney, Agent, or Firm* — Manabu Kanesaka

(57) ABSTRACT

An audio output circuit of a condenser microphone includes a condenser microphone unit, first and second impedance conversion circuits that receive a positive phase output signal and a reverse phase output signal from the condenser microphone unit, first and second output circuits that output an audio signal from the condenser microphone unit in a balanced line to a balanced output terminals upon receipt of outputs of the first and second impedance conversion circuits. First and second impedance conversion circuits respectively use FETs as source follower circuits and supply first and second impedance conversion outputs generated across source resistors to the first and second output circuits. A voltage regulating device that generates a constant voltage is connected in series to the source resistors. With this configuration, an audio output circuit of a condenser microphone is provided, which solves a problem of operation instability caused by variation of Idss's of the FETs.

7 Claims, 3 Drawing Sheets

AUDIO OUTPUT CIRCUIT OF CONDENSER MICROPHONE

RELATED APPLICATIONS

The present application is based on, and claims priority from, Japanese Application No. JP2015-171654 filed Sep. 1, 2015, the disclosure of which is hereby incorporated by reference herein in its entirety.

BACKGROUND OF THE INVENTION

Field of the Invention

The present invention relates to an audio output circuit of a condenser microphone, and especially relates to improvement of an audio output circuit that outputs an audio signal in a balanced line.

Description of the Related Art

A condenser microphone has a diaphragm and a fixed electrode disposed opposite and has an extremely high output impedance, and thus requires an impedance conversion circuit that converts the output impedance to low impedance.

In the impedance conversion circuit, a field effect transistor (FET) or a vacuum tube is used. However, many of the condenser microphones currently use the former impedance conversion circuit using an FET.

Further, an audio signal from the impedance conversion circuit is converted into a balanced output signal, and is supplied to a microphone amplifier such as a mixer through a shielded balanced cable. Further, a known phantom power supply is equipped at the microphone amplifier side, and an operating power is supplied to a condenser microphone side through the shielded balanced cable.

That is, the condenser microphones using the shielded balanced cable is insusceptible to an influence of external noises by transmitting the audio signal in a balanced line and allows to obtain the operating power for an audio output circuit including the impedance conversion circuit from the microphone amplifier side at the same time.

Incidentally, a gooseneck-type microphone is known as a microphone that operates the audio output circuit including the impedance conversion circuit and controls lighting of a light-emitting device mounted at a microphone main body side using the operating power from the phantom power supply.

This gooseneck-type microphone is favorably used as a conference microphone installed on each of speech tables of conference rooms or tables of conference attendees. The gooseneck-type microphone includes a stand arm with a long neck including a flexible pipe that enables easy adjustment of the angle and height, and a microphone main body that houses a condenser microphone unit is attached to a distal portion of the stand arm.

The gooseneck-type microphone installed in conference rooms or the like includes the light-emitting device at the microphone main body side to realize smooth progress of conferences, and a chairperson of a conference or an operator remotely operates the gooseneck-type microphone, so that light-on (light-emitting) and light-off (turning-off) operations are performed. Accordingly, a speaker whose light-emitting device is lighted is prompted to speak, and the conference can smoothly proceed.

As the light-emitting device, an electric lamp or an LED has been conventionally used, and many of these sorts of microphones currently use an LED having a small power consumption and favorable visibility as the light-emitting device.

FIG. 1 illustrates an example of a gooseneck-type microphone including a light-emitting device. A gooseneck-type microphone 1 illustrated in FIG. 1 is composed of abase unit 3 including, for example, a three-pin type output connector 2 detachably mounted to a socket which is attached on a table surface of a conference table or the like, a stand arm 4 attached to the base unit 3, and a microphone main body 5 attached to an upper end portion of the stand arm 4.

The stand arm 4 is formed of a central relay pipe 4a and flexible pipes 4b and 4c attached to upper and lower both end portions of the relay pipe 4a.

Further, a condenser microphone unit 6 and a circuit board 7 on which an audio signal output circuit including an impedance conversion circuit is mounted are housed in the microphone main body 5 attached to the upper end portion of the stand arm 4. Further, alight guide body 8 formed of a semitransparent resin material is further attached along a peripheral side surface near a lower end portion of the microphone main body 5.

Although not illustrated in FIG. 1, an LED as the light-emitting device is housed to face the light guide body 8 in the microphone main body 5.

FIG. 2 illustrates an example of an audio output circuit in a conventional condenser microphone that lights an LED as a light-emitting device using electric power supplied to the audio output circuit of the condenser microphone from the above-described phantom power supply.

Note that the circuit configuration illustrated in FIG. 2 is the same as an embodiment according to present invention illustrated in FIG. 3 described below, except for a connection of source resistors that configure first and second impedance conversion circuits. Therefore, in FIGS. 2 and 3, portions serving the same function are denoted with the same reference symbol, and a detailed connection configuration will be described below based on FIG. 3.

The audio output circuit illustrated in FIG. 2 includes first and second impedance conversion circuits using source follower circuits respectively composed of two N-channel type FETs Q1 and Q2, and first and second current amplifier circuits (output circuits) using emitter follower circuits composed of two PNP-type transistors Q3 and Q4 directly connected to the impedance conversion circuits, respectively.

An operating current is supplied from the phantom power supply mounted to a microphone amplifier side such as a mixer (not illustrated) to the FET Q1 comprising the first impedance conversion circuit and the transistor Q3 comprising the first current amplifier circuit through a terminal pin PIN2 assigned as a hot-side output terminal of an output connector.

Further, an operating current is supplied from the phantom power supply to the FET Q2 comprising the second impedance conversion circuit and the transistor Q4 comprising the second current amplifier circuit through a terminal pin PIN3 assigned as a cold-side output terminal of the output connector.

A condenser microphone unit 6 is connected to a gate of the FET Q1, and a signal from the condenser microphone unit 6 is outputted with a converted impedance to a source resistor R1 of the FET Q1. A source output thereof is inputted to a base of the transistor Q3, and an emitter output which is current-amplified by the transistor Q3 is outputted to the terminal pin PIN2 as a hot-side audio signal.

Further, the emitter output of the transistor Q3 is supplied to a gate of the FET Q2 through a low pass filter made of a resistor R3 and a condenser C1, and a DC-cut condenser C2. A source output with converted impedance output to a source resistor R2 of the FET Q2 is inputted to abase of the transistor Q4, and an emitter output with a current amplified by the transistor Q4 is outputted to the terminal pin PIN3 as a cold-side audio signal.

With the above-described configuration, the audio signal from the condenser microphone unit 6 is outputted in a balanced line to the terminal pins PIN2 and PIN3 of the output connector as the hot-side and cold-side audio signals, respectively.

The condenser microphone having the above-described circuit configuration is disclosed, especially in FIG. 3, in JP 2015-97312 A.

In the circuit configuration illustrated in FIG. 2, four LEDs connected in series, with the reference symbol LE1, are mounted as the light-emitting device.

Further, current-regulated diodes CR1 and CR2 are included whose anodes are connected respectively to the terminal pins PIN2 and PIN 3 of the output connector. Cathodes of the current-regulated diodes CR1 and CR2 are commonly connected, and the LEDs are connected in series to a common connection point of the cathodes, and a drive current is supplied from the current-regulated diodes.

Note that, in the circuit example illustrated in FIG. 2, a cathode of the LEDs connected in series with the reference symbol LE1 is connected to the terminal pin PIN1 of the output connector. That is, in this circuit example, the terminal pin PIN1 is used for light on/off control of the LEDs, and the audio output circuit illustrated in FIG. 2 is ground-connected with the microphone amplifier side using a frame ground terminal SI of the output connector.

Therefore, as illustrated in FIG. 2, a switch SW is connected to between the terminal pin PIN1 and the frame ground terminal SI of the output connector, to thereby remotely operate the light on/off operations of the LEDs illustrated by the reference symbol LE1 and connected in series.

SUMMARY OF THE INVENTION

Incidentally, the audio output circuit of the condenser microphone illustrated in FIG. 2, the FETs Q1 and Q2 that respectively configure the impedance conversion circuits have large variation in Idss, as is well known. Note that the Idss is a drain current (drain saturation current) that flows when a gate-source voltage is 0 V.

Therefore, in the transistors Q3 and Q4 the bases of which are directly connected to the drains of the FETs, base bias voltages (base-emitter voltages) of the transistors largely vary due to the variation of the Idss's of the FETs. As a result, there is a problem of large variation in a consumption current of the microphone.

That is, in a case of using 2SK2552 as the FETs Q1 and Q2 in FIG. 2, Idss's roughly vary in a range of 90 to 180 μA. Then, in a case of using 240 KΩ as the source resistors R1 and R2 and 48 V (with supply resistor 6.8 KΩ) as the phantom power supply voltage, the base voltages of the transistors Q3 and Q4 vary in a range of 21.6 to 43.2 V. As a result, the consumption current of the microphone largely varies from 9.6 to 3.2 mA.

When the consumption current of the microphone reaches a state close to a lower limit due to an influence of the variation of the Idss's, there is a substantial increase in the base bias voltages of the transistors Q3 and Q4, resulting in a state where a normal operation as the audio output circuit cannot be performed. Further, when the consumption current of the microphone reaches a state close to an upper limit due to the variation, the supply current to the LEDs as the light-emitting device becomes insufficient, leading to a decrease in emission luminance.

An objective of the present invention is to provide an audio output circuit of a condenser microphone that solves a problem of instability of an operation of the audio output circuit caused by variation of Idss's of FETs that configure impedance conversion circuits and can stabilize a light-on operation of light-emitting device when the above-described light-emitting device are included.

An audio output circuit of a condenser microphone according to the present invention includes: a condenser microphone unit; first and second impedance conversion circuits configured to receive a positive phase output signal and a reverse phase output signal from the condenser microphone unit; and first and second output circuits configured to output an audio signal from the condenser microphone unit in a balanced line to a balanced output terminal upon receipt of outputs of the first and second impedance conversion circuits, wherein the first and second impedance conversion circuits respectively use FETs as source follower connection circuits, and supply first and second impedance conversion outputs generated across source resistors to the first and second output circuit, and a voltage regulating device that generates a constant voltage is connected in series to the source resistors.

In this case, favorably, the first and second output circuits respectively use transistors as emitter follower connection circuits, and a signal from the condenser microphone unit is outputted in a balanced line from emitters of the transistors that configure the first and second output circuits.

Further, it is desirable to have a configuration in which the other end portions of the source resistors connected to the FETs that configure the first and second impedance conversion circuits are connected together to form a common connection point, and the single voltage regulating device is connected in series to the common connection point of the source resistors.

Further, one of favorable embodiments employs a configuration where a positive phase output signal and a reverse phase output signal from the condenser microphone unit are led to the first and second impedance conversion circuits by sending a signal from the emitter of the transistor forming the first output circuit to a gate of the FET forming the second impedance conversion circuit. Meanwhile, it is desirable that the first and second impedance conversion circuits and the first and second output circuits are operated using an electric power supplied from a phantom power supply to the balanced output terminals.

In this case, a light-emitting device is connected to the balanced output terminals through a constant current device that regulates a current constant, and light-on/off operations of the light-emitting device is performed using the electric power supplied from the phantom power supply to the balanced-output terminals by an operation of a manual switch connected to the other end portion of the light-emitting device.

In addition, the light-emitting device is configured such that a plurality of LEDs is connected in series, and favorably, a voltage regulating device that generates a constant voltage is connected in parallel to a series connection circuit of the LEDs.

According to the audio output circuit of the condenser microphone having the above-described configuration, the first and second impedance conversion circuits having the FETs as the source follower connection circuits are used, and the first and second impedance conversion outputs generated across the respective source resistors are supplied to the first and second output circuits, respectively.

In this case, the configuration is employed in which the voltage regulating device is connected in series to the respective source resistors. Therefore, when a bipolar transistor is used as the output circuit, a variation range of a bias level applied to a base of the bipolar transistor, the variation being caused due to the variation of the Idss's of the FETs, can be reduced.

Therefore, the variation range of the consumption current of the microphone due to the output circuit is suppressed, and thus the problem of instability of the operation of the audio output circuit due to the variation of the Idss's of the FETs can be solved. Further, when the light-emitting device is included in the microphone main body, the light-on operation of the light-emitting device can be stabilized.

DESCRIPTION OF THE PREFERRED EMBODIMENTS

Hereinafter, an audio output circuit of a microphone according to the present invention will be described based on an embodiment illustrated in FIG. 3.

Figure 1:
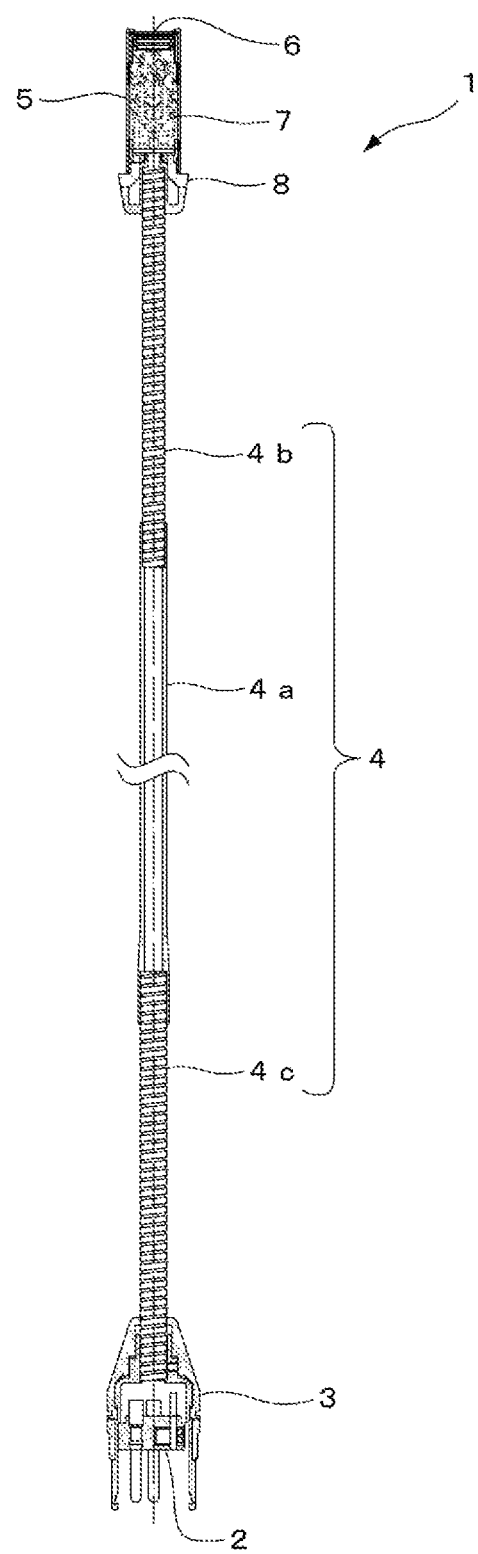
FIG. 1 is an external view illustrating an example of a gooseneck-type microphone including a light-emitting device.
Figure 3:
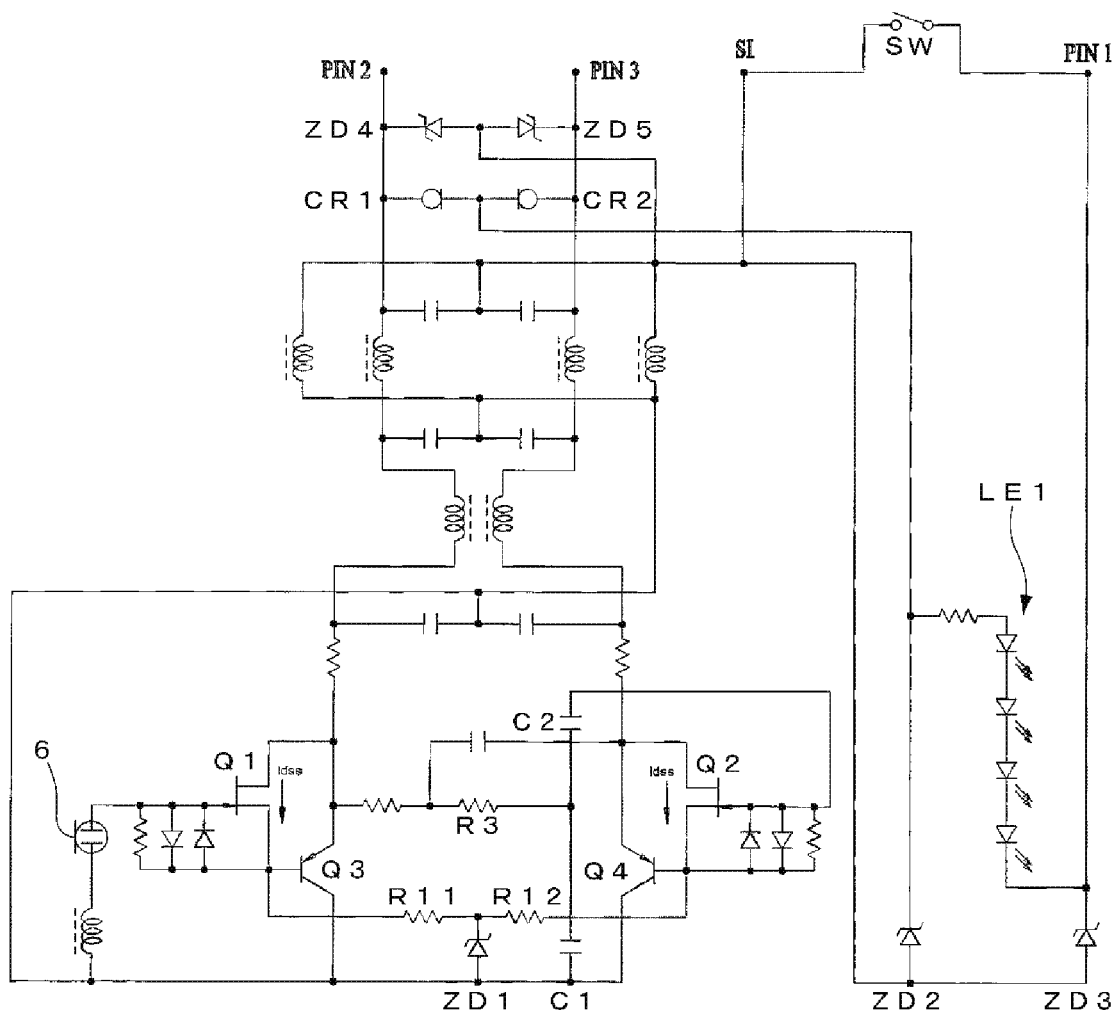
FIG. 3 is a circuit configuration diagram illustrating an embodiment of an audio output circuit of a microphone according to present invention.

An audio output circuit of a microphone illustrated in FIG. 3 is mounted on a circuit board 7 in a microphone main body 5 of a gooseneck-type microphone 1 illustrated in FIG. 1.

A condenser microphone unit 6 that produces a signal being sent to the audio output circuit illustrated in FIG. 3 is an electret condenser microphone unit including an electret dielectric film formed on either one of a diaphragm and a fixed electrode that face each other.

In the microphone unit 6 illustrated in FIG. 3, for example, an electrode of the diaphragm is connected to a reference potential point (ground) of the circuit, and the fixed electrode is connected to a gate of an FET forming a first impedance conversion circuit indicated by the reference symbol Q1.

Then, an operating current from a phantom power supply (not illustrated, 48 V; supplied through a resistor of 6.8 KΩ) is supplied to a drain of the FET Q1 forming the first impedance conversion circuit through a terminal pin PIN2 that functions as a hot-side output of an output connector 2. Further, a source resistor R11 is connected to a source of the FET Q1, and a Zener diode Z1 as a voltage regulating device is further connected in series to the source resistor R11, to thereby configure a source follower circuit.

That is, an anode of the Zener diode Z1 is connected to the source resistor R11, and a cathode of the Zener diode Z1 is connected to the ground.

Note that across the gate and source of the FET Q1, having a built-in biasing circuit, diodes are connected in antiparallel and a resistor is connected in parallel.

Then, an impedance conversion output generated in a series circuit of the source resistor R11 and the Zener diode ZD1 is supplied to a base of a transistor Q3. The transistor Q3 operates as an emitter follower circuit (first output circuit) in which a collector is connected to the ground and an operating current from the phantom power supply is supplied to an emitter through the terminal pin PIN2. Therefore, in this emitter follower circuit, the supply resistor (a phantom resistor; 6.8 KΩ) at the phantom power supply side functions as an emitter resistor, and the terminal pin PIN2 serves as a hot-side output terminal of an audio signal, accordingly.

An emitter output of the transistor Q3 is supplied to a low pass filter comprised of a resistor R3 and a condenser C1, and an output through the low pass filter is supplied to a gate of an FET Q2 forming a second impedance conversion circuit, through a DC-cut condenser C2.

The emitter output of the transistor Q3 at this time is a reverse phase output signal to a positive phase output signal from the condenser microphone unit 6, the positive phase output signal being applied to the gate of the FET Q1 forming the first impedance conversion circuit. Therefore, the positive phase output signal and the reverse phase output signal from the condenser microphone unit are respectively applied to the first and second impedance conversion circuits configured from the FETs Q1 and Q2.

The FET Q2 forming the second impedance conversion circuit has a built-in biasing circuit similar to the FET Q1, and an operating current from the phantom power supply (48 V; supplied through a resistor of 6.8 KΩ) is supplied to a drain of the FET Q2 through a terminal pin PIN3 that functions as a cold-side output of the output connector.

Further, a source resistor R12 is connected to a source of the FET Q2, and the anode of the Zener diode Z1 is further connected in series to the source resistor R12 as the voltage regulating device, thereby to configure a source follower circuit.

Further, an impedance conversion output generated at both ends of a series circuit of the source resistor R12 and the Zener diode ZD1 is supplied to a base of a transistor Q4. The transistor Q4 configures an emitter follower circuit (second output circuit) in which a collector is connected to the ground, and an operating current from the phantom power supply is supplied to an emitter through the terminal pin PIN3. Therefore, in this emitter follower circuit, the supply resistor (6.8 KΩ) at the phantom power supply side functions as an emitter resistor, and the terminal pin PIN3 becomes a cold-side output terminal of the audio signal, accordingly.

Note that, in the circuit configuration illustrated in FIG. 3, the common voltage regulating device (the Zener diode ZD1) is connected to a common connection point of the source resistors R11 and R12 of the FETs Q1 and Q2 that configure the first and second impedance conversion circuits.

In this case, a configuration in which voltage regulating devices are individually connected to the source resistors R11 and R12 may be employed. However, in the example illustrated in FIG. 3, the other end portions of the source resistors R11 and R12 connected to the FETs Q1 and Q2 are commonly connected, and the single voltage regulating device (the Zener diode ZD1) is connected in series to the common connection point. Accordingly, the embodiment according to the present invention has only a difference in that the Zener diode ZD1 is added to the already described circuit configuration illustrated in FIG. 2.

Figure 2:
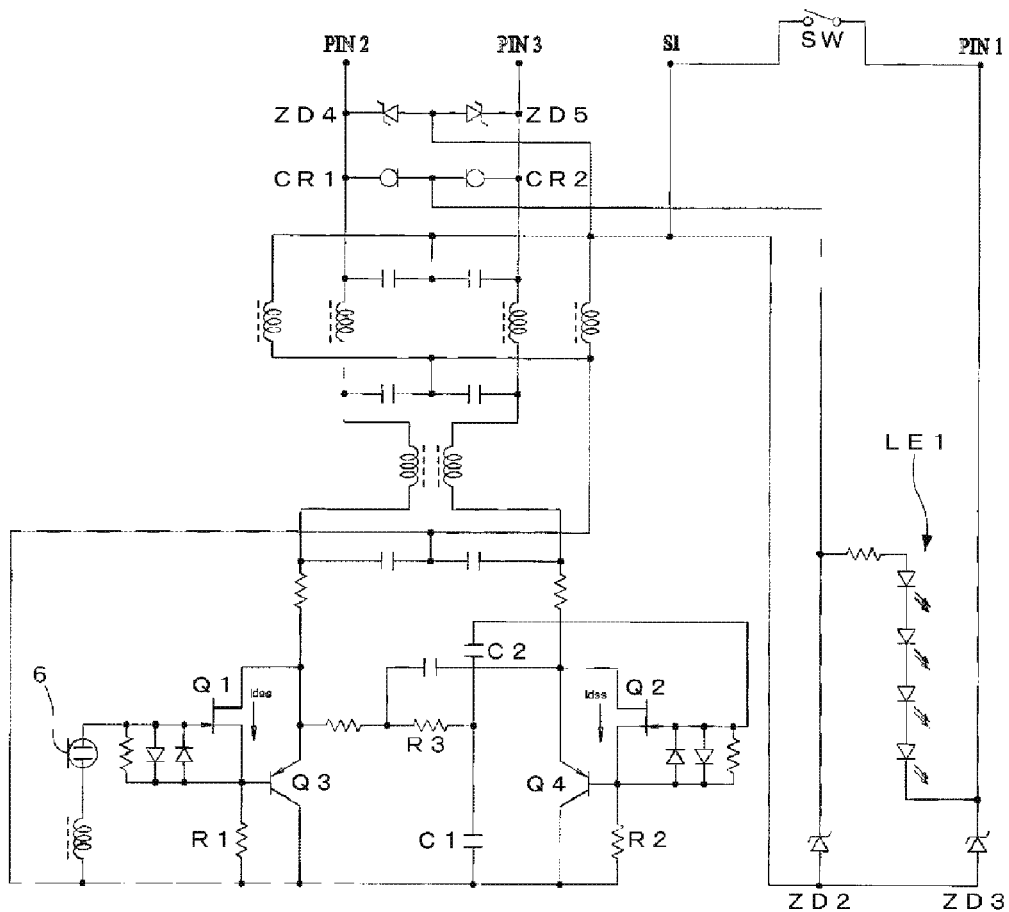
FIG. 2 is a circuit configuration diagram illustrating an example of an audio output circuit of a conventional microphone.

Further, in the circuit configuration illustrated in FIG. 3, four LEDs connected in series and illustrated by the reference symbol LE1 are mounted as a light-emitting device, and this is the same as the circuit configuration illustrated in FIG. 2.

That is, cathodes of current regulator diodes CR1 and CR2 with anodes being respectively connected to the terminal pins PIN2 and PIN3 of the output connector are commonly connected, and the LEDs are connected in series to a common connection point of the cathodes, so that a drive current is supplied from the phantom power supply to the LEDs through the common connection point.

Further, a cathode of the LEDs connected in series and illustrated by the reference symbol LE1 is connected to the terminal pin PIN1 of the output connector, and the terminal pin PIN1 is used for light on/off control of the LEDs. Then, the audio output circuit illustrated in FIG. 2 is ground-connected with the microphone amplifier side using a frame ground terminal SI of the output connector.

In addition, a switch SW is connected to between the terminal pin PIN1 and the frame ground terminal SI of the output connector, and light on/off operations of the LEDs connected in series and illustrated by the reference symbol LE1 can be remotely operated with the switch SW.

Note that a Zener diode ZD2 connected in parallel to the LEDs and a Zener diode ZD3 connected in series to the LEDs stabilize operating voltages applied to the LEDs. Further, a Zener diode ZD4 connected to between the terminal pin PIN2 and the frame ground terminal SI and a Zener diode ZD5 connected to between the terminal pin PIN3 and the frame ground terminal SI are Zener diodes for overvoltage prevention (electrostatic protection).

In addition, although not especially denoted with reference symbols, coils and condensers which are respectively connected to between the terminal pin PIN2 and the emitter of the transistor Q3 and to between the terminal pin PIN3 and the emitter of the transistor Q4 operate as filter circuits that eliminate high frequency interference signals, and a coil connected to between the condenser microphone unit 6 and the ground also serves an identical function.

In the above-described circuit configuration illustrated in FIG. 3, base voltages of the transistors Q3 and Q4 that configure the first and second output circuits are determined by respective Idss's of the FETs Q1 and Q2 connected to a preceding stage, the source resistors R11 and R12, and a Zener voltage of the Zener diode ZD1.

Then, in the circuit configuration illustrated in FIG. 3, 2SK2552 is used as the FETs Q1 and Q2, for example, and Idss's thereof roughly vary in a range of 90 to 180 μA. When a resistor of 15 KΩ as the source resistors R11 and R12 and an EDZV16 (Zener voltage=15.85 to 16.51 V) as the Zener diode ZD1, the base voltages of the transistors Q3 and Q4 become about 17.2 to 19.2 V, and the variation of the base voltage can be largely reduced, compared with the base potentials (21.6 to 43.2 V) of the transistors Q3 and Q4 in the circuit configuration illustrated in FIG. 2.

As a result, a consumption current of the microphone is stabilized to 8.8 to 8.2 mA, and the audio output circuit of the condenser microphone with the stabilized lighting operation of the light-emitting device can be provided even if the light-emitting device is included in the microphone main body.

Note that, in the above-described embodiment, an example in which the present invention is applied to a gooseneck-type microphone has been described. However, the present invention can be employed for condenser microphones other than the gooseneck-type microphone.

Further, the present invention can be employed for a condenser microphone not including a light-emitting device (LED), and an audio output circuit of the condenser microphone where a problem of instability of operation of the audio output circuit resulting from variation of Idss's of FETs is solved can be provided.

What is claimed is:

1. An audio output circuit of a condenser microphone comprising:
    a condenser microphone unit;
    first and second impedance conversion circuits configured to receive a positive phase output signal and a reverse phase output signal from the condenser microphone unit; and
    first and second output circuit configured to output an audio signal from the condenser microphone unit in a balanced line to a balanced output terminal upon receipt of outputs of the first and second impedance conversion circuits, wherein
    the first and second impedance conversion circuits respectively use FETs as source follower connection circuits, and supply first and second impedance conversion outputs generated across source resistors to the first and second output circuits, and a voltage regulating device that generates a constant voltage is connected in series to the source resistors.

2. The audio output circuit of the condenser microphone according to claim 1, wherein
    the first and second output circuits respectively use transistors as emitter follower circuits, and a signal from the condenser microphone unit is outputted in a balanced line from emitters of the transistors that configure the first and second output circuits.

3. The audio output circuit of the condenser microphone according to claim 2, wherein
    the positive phase output signal and the reverse phase output signal from the condenser microphone unit are respectively supplied to the first and second impedance conversion circuits, by supplying a signal from an emitter of the transistor forming the first output circuit to a gate of the FET forming the second impedance conversion circuit.

4. The audio output circuit of the condenser microphone according to claim 1, wherein
    other end portions of the source resistors connected to the FETs that configure the first and second impedance conversion circuits are commonly connected, and the single voltage regulating device is connected in series to a common connection point of the source resistors.

5. The audio output circuit of the condenser microphone according to claim 1, wherein
    the first and second impedance conversion circuits and the first and second output circuits are operated using an electric power supplied from a phantom power supply as an operating power supply.

6. The audio output circuit of the condenser microphone according to claim 1, wherein
    a light-emitting device is connected to the balanced output terminals through a constant current device that regulates a current constant, and light on/off operations of the light-emitting device is performed, using the electric power supplied from the phantom power supply to the balanced output terminals, by an operation of a manual switch connected to the other end portion of the light-emitting device.

7. The audio output circuit of the condenser microphone according to claim 6, wherein
the light-emitting device is configured such that a plurality of LEDs is connected in series, and a voltage regulating device that generates a constant voltage is connected in parallel to a series connection circuit of the LEDs.

\* \* \* \* \*